Dec. 30, 1924.
J. T. LUCAS ET AL
1,521,457
METER BRACKET
Filed March 24, 1924
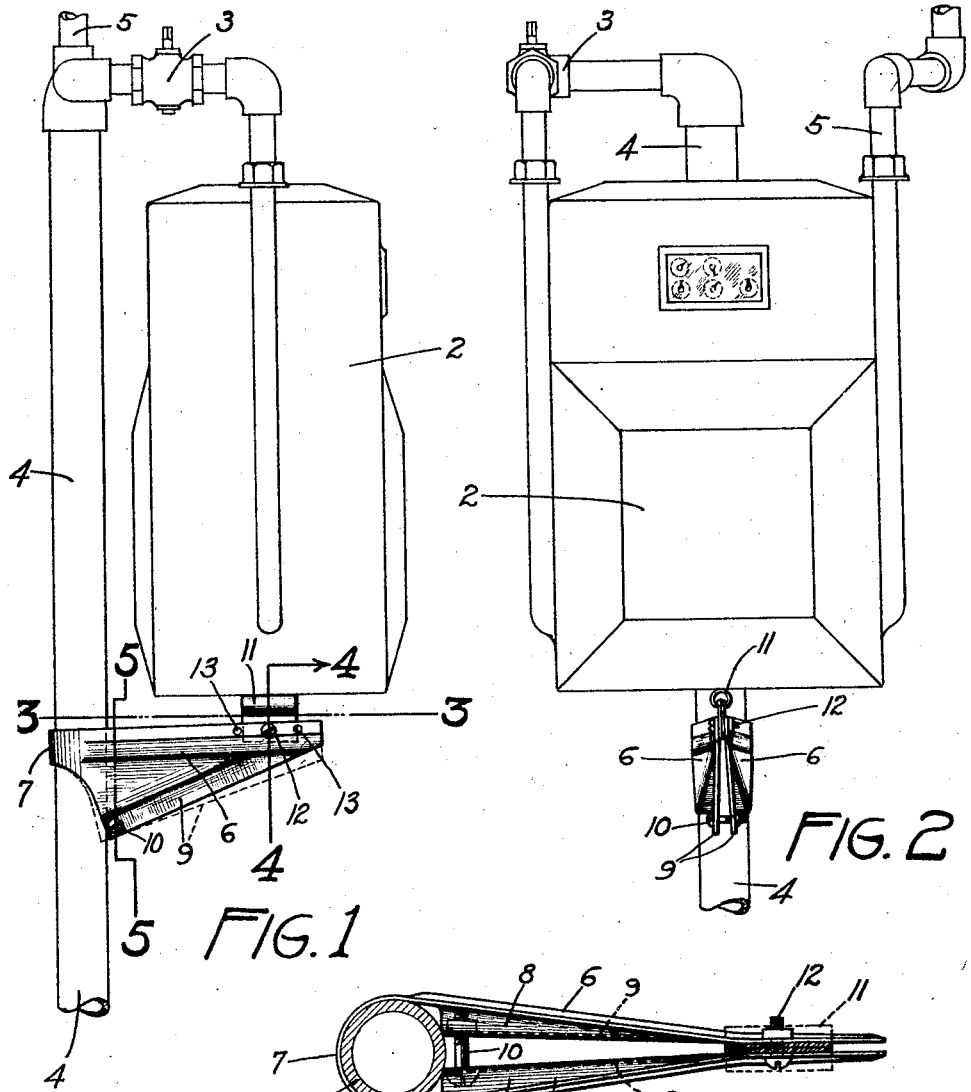
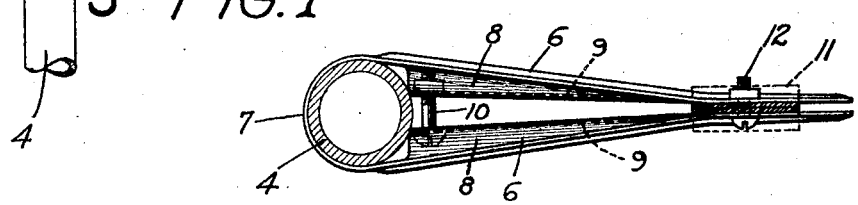
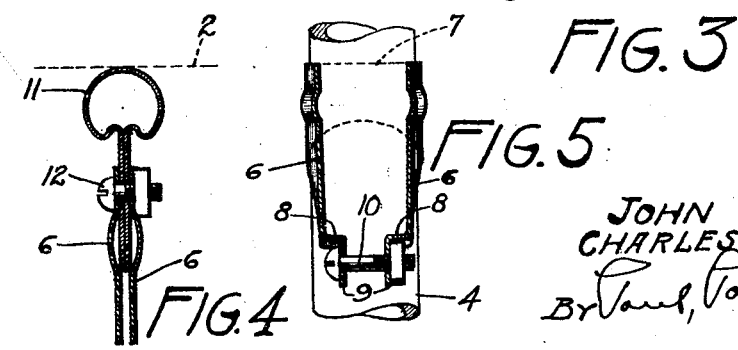
INVENTORS
JOHN T. LUCAS
CHARLES B. GAMBLE
ATTORNEYS Patented Dec. 30, 1924.

1,521,457

UNITED STATES PATENT OFFICE.

JOHN T. LUCAS AND CHARLES B. GAMBLE, OF MINNEAPOLIS, MINNESOTA.

METER BRACKET.

Application filed March 24, 1924. Serial No. 701,577.

*To all whom it may concern:*

Be it known that we, JOHN T. LUCAS and CHARLES B. GAMBLE, citizens of the United States, residents of Minneapolis, county of Hennepin, and State of Minnesota, have invented certain new and useful Improvements in Meter Brackets, of which the following is a specification.

In the operation of installing a meter it is usually necessary, particularly when a large, heavy meter is to be installed, to provide some means for supporting the weight of the meter and the house riser other than the connections of the meter with the main service pipe. It has been customary to mount a bracket on the main service pipe with one end bearing on the under side of the meter, the bracket being composed of pipe sections fitted on the service pipe with an adjustable nipple or similar section at the end bearing on the bottom of the meter. It has been found, however, that the rubbing of the pipe or coupling on the under side of the meter in obtaining the desired adjustment has resulted in wearing away the paint, exposing the metal, and allowing the accumulation of rust and the gradual corroding of the bottom of the meter until a hole is formed therein. Furthermore, brackets made in this way require considerable fitting on the service pipe and labor of assembling the bracket and mounting it on the pipe has added quite materially to the cost of the meter installation.

The object therefore of our invention is to provide a supporting means adapted for quick mounting on the service pipe and having a member arranged to engage the wall of the meter and present a smooth surface for contact therewith and prevent wearing the paint on the metal and exposing it to corrosion.

A further object is to provide a bracket having a simple inexpensive means for clamping it on the service pipe and at the same time raising its outer end to exert a lifting pressure on the bottom of the meter.

A further object is to provide a bracket which can be made of waste or scrap material thereby greatly reducing its initial cost.

The invention consists generally in various constructions and combinations all as hereinafter described and particularly pointed out in the claims.

In the accompanying drawings forming part of this specification,

Figure 1 is a side elevation of a meter and service pipe showing our improved bracket thereon;

Figure 2 is a front view;

Figure 3 is a sectional view on the line 3—3 of Figure 1;

Figure 4 is a sectional view on the line 4—4 of Figure 1;

Figure 5 is a sectional view on the line 5—5 of Figure 1.

In the drawing 2 represents a gas meter of any conventional form having the usual connections 3 with the gas service pipe 4 on one side of the meter and the connections 5 on the other side leading to the house riser of the system of piping in the structure where the meter may be installed.

For the purpose of carrying the weight of the meter and house riser and relieving the pipe connections of the strain thereon, we provide a bracket stamped preferably from sheet metal comprising side members 6 formed by doubling the bracket upon itself, the part connecting these members at one end forming a loop 7 to embrace the service pipe 4. The lower inner portion of the folded bracket is cut away as indicated in Figure 1 and the lower edges of the side member 6 are inwardly turned as indicated at 8 and have depending flanges 9 connected by a bolt 10. The inner ends of the flanges bear on the surface of the pipe as shown plainly in Figure 3, and when the nut on the bolt 10 is tightened to draw the flanges 9 together the engagement of the ends of the flanges with the rounded surface of the pipe causes an outward and upward movement to be imparted to the flanges and the bracket, raising the bracket as indicated by dotted lines in Figure 1; this tightening of the bolt also clamping the bracket firmly on the service pipe. At the outer end of the bracket we prefer to provide a loop 11 formed preferably by folding a piece of sheet metal which may be the strip cut from the inner lower corner of the bracket; the rounded upper portion of the loop bearing on the under side of the meter and the lower ends of the loop fitting between the sections 6 of the bracket and secured thereto by suitable means such as a bolt 12. A series of holes 13 are provided in the upper forward portion of the bracket to allow for the adjustment of the loop for the purpose of moving it toward or from the service pipe until its desired point of bearing on the meter is obtained. This loop is free to rock on its support and when the bracket is raised and the loop contacts with the under side of the meter it will tilt and adjust itself to the under surface of the meter and fitting smoothly thereon will exert the desired upward pressure to aid in supporting the meter and house riser without in any way scratching or marring the paint and exposing the metal bottom of the meter to the action of corrosion. It is only necessary to loosen the bolt 10 to release the clamp of the bracket on the service pipe and allow it to drop away from the meter. A device of this kind is very simple and inexpensive to manufacture and can be easily and quickly applied to a service pipe and adjusted for a lifting contact with the wall of the meter.

We claim as our invention:

1. The combination with a service pipe and a meter connected therewith, of means arranged to embrace said pipe and having opposing walls to bear on the rounded surface of the pipe, and means connecting said walls for drawing them together on the pipe surface and clamping said means on said pipe, the drawing together of said walls on said rounded surface forcing the outer end of said means upwardly to engage and exert a lifting action on the bottom of the meter.

2. The combination with a service pipe and meter, of a bracket having opposing walls, means for clamping said bracket on said pipe, the drawing together of said walls during the clamping operation raising the outer end of said bracket to exert a lifting action on said meter.

3. The combination with a service pipe and meter, of a bracket composed of sheet metal having sections folded into opposing relation with a connecting loop between them adapted to encircle said pipe, said opposing sections having flanges to bear on the rounded surface of the pipe, and means passing through said flanges for drawing them together, said flanges when drawn together on said rounded surface operating to tighten said loop on the pipe and raise the outer end of said bracket, said bracket having a rounded surface for contact with the bottom of the meter.

4. The combination with a service pipe and meter, of a sheet metal bracket adapted to be folded around said service pipe and having opposing side members with flanges thereon to bear on the surface of the pipe, a bolt passing through said flanges for drawing them together on the surface of the pipe and raising the outer ends of said members, and a loop pivoted on the outer end of said bracket and having a rounded surface for contact with the under side of the meter to exert a lifting action thereon when said bracket is clamped on said pipe, said loop being free to adjust itself on its pivot to the bottom of the meter.

5. The combination with a service pipe and meter, of a bracket having opposing walls and means for clamping them on said pipe the drawing together of said walls during the clamping operation raising the outer end of said bracket to exert a lifting action on the meter, said bracket having means for adjustable contact with the bottom of the meter.

In witness whereof, we have hereunto set our hands this 21st day of March 1924.

JOHN T. LUCAS.
CHAS. B. GAMBLE.